(12) United States Patent
Weyrauch et al.

(10) Patent No.: US 12,151,571 B2
(45) Date of Patent: Nov. 26, 2024

(54) ADAPTER SYSTEM FOR ELECTRICAL CONNECTION OF A CONNECTOR OF A CABLING TO DIFFERENT CONTACT ARRANGEMENTS OF DIFFERENT CHARGING SOCKETS

(71) Applicant: TE Connectivity Germany GmbH, Bensheim (DE)

(72) Inventors: Dirk Weyrauch, Bensheim (DE); Philipp Kowarsch, Bensheim (DE); Dominik Heiss, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 350 days.

(21) Appl. No.: 17/836,336

(22) Filed: Jun. 9, 2022

(65) Prior Publication Data
US 2022/0396162 A1 Dec. 15, 2022

(30) Foreign Application Priority Data
Jun. 10, 2021 (DE) .......................... 102021115051.5

(51) Int. Cl.
*B60L 53/16* (2019.01)
*H01R 13/627* (2006.01)
(Continued)

(52) U.S. Cl.
CPC ............ *B60L 53/16* (2019.02); *H01R 13/627* (2013.01); *H01R 31/06* (2013.01); *H01R 31/065* (2013.01);
(Continued)

(58) Field of Classification Search
CPC ....... B60L 53/16; H01R 13/627; H01R 31/06; H01R 31/065; H01R 13/6453;
(Continued)

(56) References Cited

U.S. PATENT DOCUMENTS 7,040,931 B1 * 5/2006 Achtner ................... H01R 9/11
439/651
7,857,643 B2 * 12/2010 Dobler ................... H01R 27/00
439/172
(Continued)

FOREIGN PATENT DOCUMENTS

DE         20109106 U1      1/2002
DE    102004033636 A1  *  3/2005  ............. H01R 29/00
(Continued)

OTHER PUBLICATIONS

German Office Action, Application No. 102021115051.5, Dated: Feb. 16, 2022, 9 pages.
(Continued)

*Primary Examiner* — Travis S Chambers
(74) *Attorney, Agent, or Firm* — Barley Snyder (57) ABSTRACT

An adapter system for the electrical connection of a connector of a cabling to different contact arrangements of different charging sockets along a connection axis includes an adapter housing and a fastening element attaching the adapter housing to one of the charging sockets. The adapter housing has a contact surface extending perpendicularly to the connection axis and a plurality of contact openings extending along the connection axis. The contact surface is disposed at an end of the adapter housing on a socket side. An end of the adapter housing on a cable side has a cabling interface connecting to the connector. The end of the adapter housing on the socket side is attachable to each of the charging sockets by the fastening element with the contact surface in a predetermined rotational position relative to the connection axis.

18 Claims, 11 Drawing Sheets

(51) Int. Cl.
*H01R 31/06* (2006.01)
*H01R 13/645* (2006.01)

(52) U.S. Cl.
CPC ...... *H01R 13/6453* (2013.01); *H01R 2201/26* (2013.01)

(58) Field of Classification Search
CPC .. H01R 2201/26; H01R 13/502; H01R 13/40; H01R 13/516; H01R 27/00; Y02T 10/70; Y02T 10/7072; Y02T 90/14
See application file for complete search history.

(56) References Cited

U.S. PATENT DOCUMENTS

| | | | |
|---|---|---|---|
| 9,083,110 B2* | 7/2015 | McClelland | H01R 13/6205 |
| 10,483,704 B1* | 11/2019 | Solland | H01R 29/00 |
| 11,749,934 B2* | 9/2023 | Feldner | H01R 13/506 |
| | | | 439/76.2 |
| 2008/0283511 A1* | 11/2008 | Yunk | H01R 31/06 |
| | | | 219/130.1 |
| 2010/0227505 A1 | 9/2010 | Markyvech | |
| 2011/0039435 A1* | 2/2011 | Huang | H01R 31/06 |
| | | | 439/651 |
| 2015/0224887 A1 | 8/2015 | Toth | |
| 2015/0229055 A1 | 8/2015 | Fukushima et al. | |
| 2019/0296452 A1 | 9/2019 | Zhang | |
| 2021/0013660 A1 | 1/2021 | Markefka | |

FOREIGN PATENT DOCUMENTS

| | | | | |
|---|---|---|---|---|
| DE | 102011004834 A1 | | 8/2012 | |
| DE | 102012019605 A1 | | 4/2014 | |
| DE | 202013012354 U1 | | 7/2016 | |
| DE | 102016106829 A1 | * | 10/2017 | ......... H01R 13/6456 |
| EP | 3276758 A1 | * | 1/2018 | ............ H01R 13/40 |
| IT | 1050906 B | * | 3/1981 | ............ H01R 27/00 |
| WO | 2015044452 A1 | | 4/2015 | |

OTHER PUBLICATIONS

Extended European Search Report dated Nov. 3, 2022, corresponding to Application No. 22177599.2-1201, 11 pages.

* cited by examiner

ADAPTER SYSTEM FOR ELECTRICAL CONNECTION OF A CONNECTOR OF A CABLING TO DIFFERENT CONTACT ARRANGEMENTS OF DIFFERENT CHARGING SOCKETS

CROSS-REFERENCE TO RELATED APPLICATIONS

This application claims the benefit of the filing date under 35 U.S.C. § 119(a)-(d) of German Patent Application No. 102021115051.5, filed on Jun. 10, 2021.

FIELD OF THE INVENTION

The present invention relates to an adapter system for the electrical connection of a connector of a cabling to different contact arrangements of different charging sockets along a connection axis.

BACKGROUND

Due to the increasing proportion of electrical power generated from renewable energy sources and far-reaching international treaties on the reduction of greenhouse gases, transportation devices powered by electric motors, for example electric vehicles, i.e. motor vehicles with an electric drive, are becoming increasingly important. Electric automobiles are examples of electric motor vehicles which also comprise other motor vehicles for transporting people and goods, such as trains, bicycles, electric scooters, and the like. In general, an electric motor-driven transportation device is understood to mean a motor vehicle for transportation with wheels which is driven by an electric motor as a so-called electric drive and which stores the electrical energy required for its locomotion in rechargeable batteries or cell blocks of existing traction batteries. Such transportation devices driven by electric motors themselves do not emit any relevant pollutants during operation so that they are classified as being emissions-free transportation devices as compared to fuel-driven vehicles.

With regard to the charging of electric motor-driven transportation devices, in particular electric vehicles, almost all charging systems are indeed based on a standard. However, there are different types of charging connectors having different geometries and configurations that have been specially created for electric vehicles. There are therefore different charging options available worldwide which depend on the manufacturer and the model.

The arrangement of the contacts in the charging inputs for plug-in hybrid or electric vehicles is defined by international standards, for example SAE 1772, IEC 62196, GB/T 20234.2 and others. Each of these standards defines a different geometry (spatial arrangement of the contacts relative to each other) of the contact arrangement of a corresponding charging socket. As a result, different charging inputs must be used in the vehicles for each charging input geometry.

The result of the differences in the charging input geometries is that the wiring/cabling in the transportation devices, which connects the charging socket in the vehicle to its traction battery, must also be specifically adapted and designed for the different contact arrangements. The different configurations, i.e. the number of AC phases, single-phase, two-phase, and three-phase charging exists, further complicate the vehicle's internal cabling and its connection to the contact arrangement of a charging socket. A single-phase charging system, as is often used in the US and Japan, has, for example, three contact elements which are arranged substantially in a triangle and of which one contact element is the ground and two contact elements are the current conductors. In a three-phase system, as is often used in Europe, the contact arrangement of the charging socket comprises five contact elements arranged in two rows, one row with three contact elements and one row with two contact elements. This configuration has the shape of a recumbent "D" and where one contact element is provided for ground and the other four contact elements are current conducting elements. An adapter system is needed which can connect a connector of a cabling to different contact arrangements of different charging sockets.

SUMMARY

An adapter system for the electrical connection of a connector of a cabling to different contact arrangements of different charging sockets along a connection axis includes an adapter housing and a fastening element attaching the adapter housing to one of the charging sockets. The adapter housing has a contact surface extending perpendicularly to the connection axis and a plurality of contact openings extending along the connection axis. The contact surface is disposed at an end of the adapter housing on a socket side. An end of the adapter housing on a cable side has a cabling interface connecting to the connector. The end of the adapter housing on the socket side is attachable to each of the charging sockets by the fastening element with the contact surface in a predetermined rotational position relative to the connection axis.

BRIEF DESCRIPTION OF THE DRAWINGS

The invention will now be described by way of example with reference to the accompanying Figures, of which.

DETAILED DESCRIPTION OF THE EMBODIMENT(S)

The invention shall be explained in more detail below with reference to the drawings using exemplary embodiments, the different features of which can be combined with one another as desired. In particular, individual features can be added to the existing embodiments if the effect of these features is necessary for a specific application. Conversely, individual features can be omitted from the existing embodiments if the technical effect of these features is not important in a specific application. Similar, identical, and functionally identical elements in the drawings are provided with identical reference characters to the extent as appropriate.

The principle of the adapter system according to the invention as well as of the parts kit and its components shall be described hereafter with reference to the exemplary embodiments shown in the figures.

Figure 1:
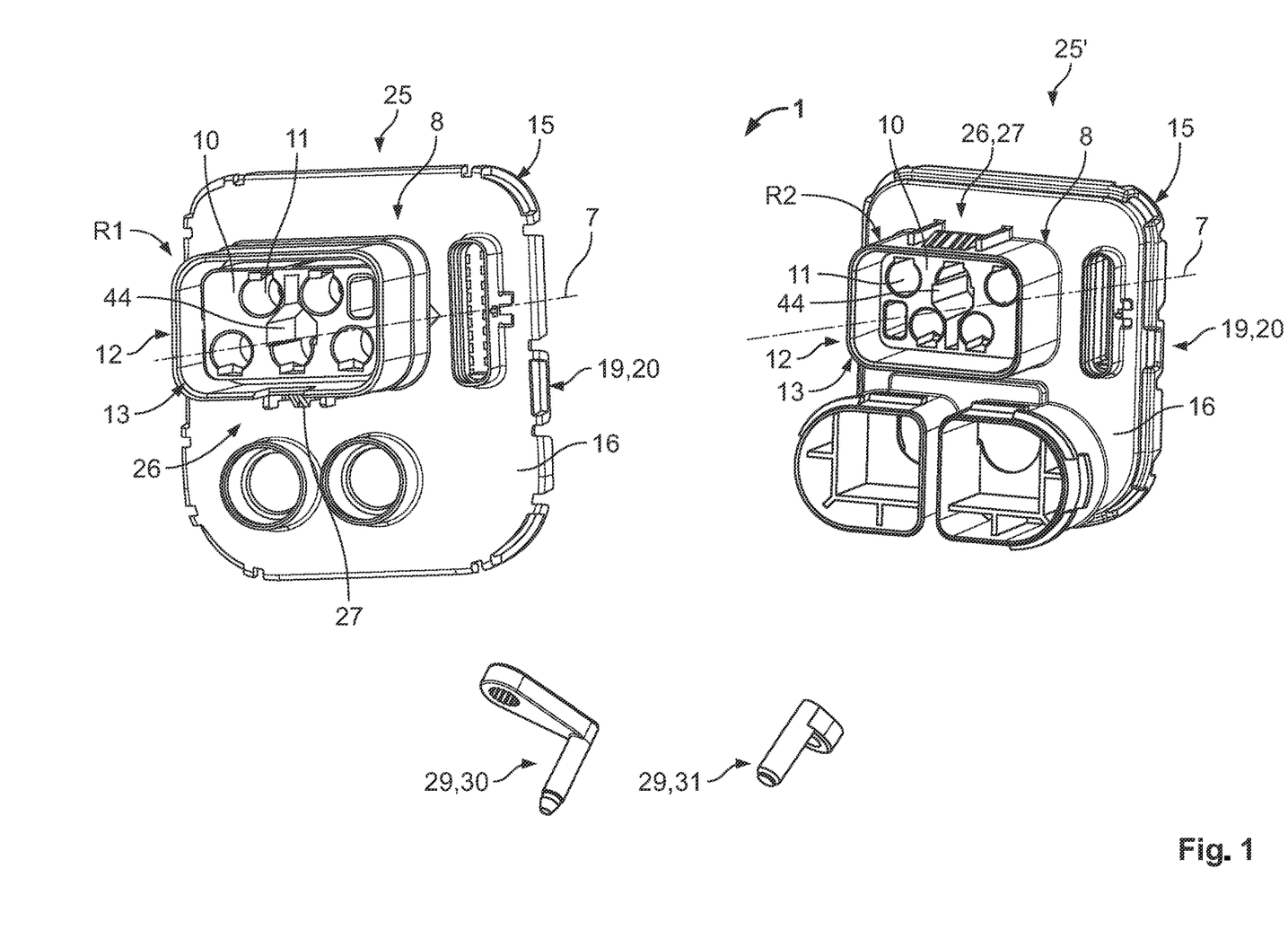
FIG. 1 is a front perspective view of an adapter system according to an embodiment.
Figure 2:
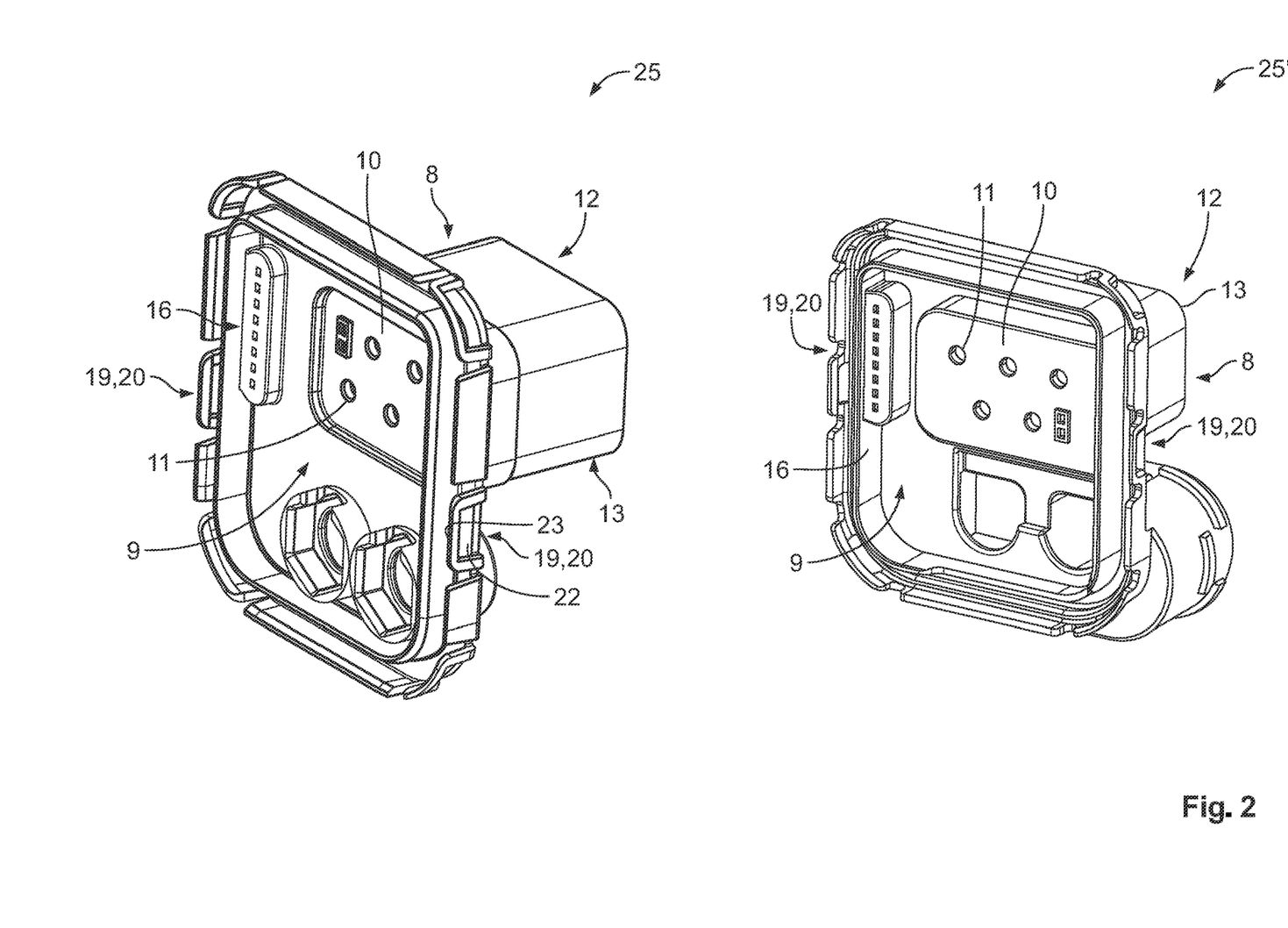
FIG. 2 is a rear perspective view of the adapter system.

FIGS. 1 and 2 show a first embodiment of an adapter system 1 for the electrical connection of a connector 2 of a cabling 3 to different contact arrangements 4 of different charging sockets 5, 6, namely of a three-phase charging socket 5 as well as of a single-phase charging socket 6, along a connection axis 7.

Adapter system 1 comprises an adapter housing 8. Adapter housing 8 is provided with a contact surface 10 on an end 9 on the socket side. Contact surface 10 extends substantially perpendicularly to connection axis 7 and comprises contact openings 11. Contact openings 11 can be penetrated along connection axis 7. Contact surface 10 can therefore be penetrated through contact openings 11 in the direction of connection axis 7 for establishing the electrical connection.

Adapter housing 8 also comprises a cabling interface 13 on an end 12 on the cable side for connecting connector 2. When viewed in the direction of connection axis 7, end 12 on the cable side is disposed at the end of adapter housing 8 opposite end 9 on the socket side. Cabling interface 13 is compatible with connector 2. Connector 2 can be connected to cabling interface 13 of adapter housing 8 in that connector 2 is introduced into cabling interface 13 along connection axis 7. In the mounted state (see e.g. FIG. 6), connector contacts 14 are aligned with contact openings 11 along connection axis 7. Connector contacts 14 are, for example, socket contacts which are electrically conductively connected to the conductors of cabling 3.

Adapter system 1 also comprises a fastening element 15 for attaching adapter housing 8 to charging sockets 5, 6. End 9 of adapter housing 8 on the socket side is attached to respective charging socket 5, 6 by way of at least one fastening element 15, which shall be described in more detail hereafter.

In adapter system 1 according to the invention, end 9 of adapter housing 8 on the socket side is attachable in dependence of contact arrangement 4 to respective charging socket 5, 6 by way of fastening element 15 with its contact surface 10 in a predetermined rotational position R1, R2 relative to connection axis 7. In the exemplary embodiments shown in the figures, two rotational positions R1 and R2 are presented. In rotational position R1, contact surface 10 is rotated by 180° compared to rotational position R2, as can be seen clearly in FIG. 1 and FIGS. 3 and 4.

The present invention makes it possible in a structurally simple but very effective manner to electrically contact different contact arrangements 4 of different charging sockets 5, 6 with same connector 2 and to thereby connect contact arrangement 4 to an internal battery, for example, of an electric motor-driven transportation device. All that is required for this is that contact surface 10 of adapter housing 8 be attached in dependence of the contact arrangement to respective charging socket 5, 6 by way of fastening element 15 in a specific rotational position R1, R2.

Figure 4:
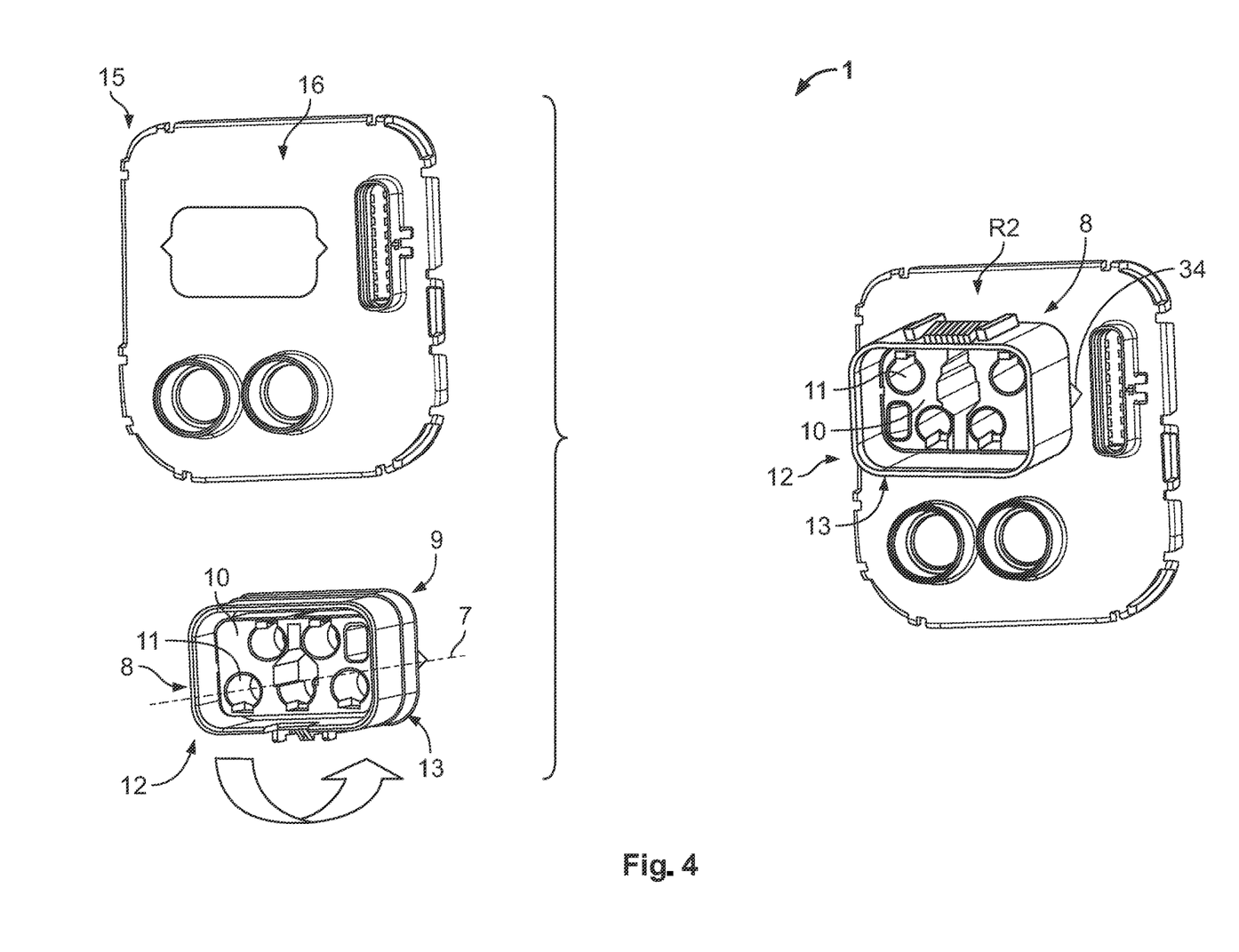
FIG. 4 is another perspective view of the adapter system of FIG. 3.

The different rotational positions R1, R2 are obtained by rotating contact surface 10, which extends perpendicular to connection axis 7, about connection axis 7 (as indicated, for example, by the arrow in FIG. 4). Contact surface 10 there always remains in the same plane, i.e. contact surface 10 always remains substantially perpendicular to connection axis 7 during rotation.

No specific plug connections of the cabling, for example, of internal cabling of an electric motor-driven transportation device, are required with the adapter system 1 according to the invention for the different contact arrangements 4 of different charging sockets 5, 6. Instead, the adapter system 1 can be interposed between the connector of the cabling and the contact arrangement 4 of the charging socket 5, 6, which simplifies the manufacturing process.

Fastening element 15 can be configured as a cap 16. A rear side 17 of respective charging socket 5, 6 can be closed with cap 16. The contact openings 11 penetrate the cap 16. Rear side 17 is that end of charging socket 5, 6 which is disposed opposite plugging face 18 of charging socket 5, 6. An external cable for charging the internal battery of the transportation device is connected from the exterior into plugging face 18. For different charging sockets 5, 6, plugging face 18 has characteristic features which conform to contact arrangement 4 used in respective charging socket 5, 6. This is necessary so that the respective contact arrangement 4 can be electrically contacted by the external connector through plugging face 18. The closure of rear side 17 of charging socket 5, 6 by way of fastening element 15 configured as a cap 16 shall be explained in more detail hereafter.

Since the rear side 17 of the charging socket 5, 6 is disposed opposite its plugging face 18, it is not necessary to modify the pin-shaped contact elements of commercially available contact arrangements 4 in charging sockets 5, 6. The penetrable contact openings 11 allow for simple and reliable contacting of the contact arrangement 4 through the contact openings 11 when the cap-shaped fastening element 15 is closed and attached.

Cap 16 can comprise connecting elements 19 for affixing to respective charging socket 5, 6. Connecting elements 19 can comprise latching elements 20 which can establish a positive-fit connection, that is repeatedly detachable, to complementary locking elements 21 of charging sockets 5, 6 in order to affix cap 16 at respective charging socket 5, 6. In other embodiments, the connecting element 19 can be other types of latching elements 20, for example, a latching opening or a latching projection, or another type, for example, a fastening tab or pocket.

In the embodiment shown, cap 16 comprises two latching elements 20 as connecting elements 19. These latching elements 20 are arranged at oppositely disposed points on the circumference of cap 16 and are configured as latching openings 22. Latching openings 22 are formed in a resiliently deflectable tab 23 which, with a corresponding latching projection 24 of charging sockets 5, 6, forms a latch. The latch of latching opening 22 and latching projection 24 can be seen, for example, in FIG. 6.

The arrangement and alignment of the connecting element 19 can define the rotational position R1, R2 relative to the connection axis 7 with which the contact surface 10 is attached to the respective charging socket 5, 6. If a complementary connecting element is positioned at the respective point on the rear side of the respective charging socket 5, 6, then it is ensured in a simple and reliable manner that the end of the adapter housing 8 on the socket side is attached to the charging socket 5, 6 with its contact surface 10 in the predetermined rotational position R1, R2 relative to the connection axis 7.

In the embodiment of adapter system 1 shown in FIGS. 1 and 2, adapter housing 8 is formed integrally on cap 16. Formed integrally means that adapter housing 8 and cap 16 are formed monolithically from one part, for example, as an injection molded part. This is advantageous for sealing the rear side of charging socket 17 by way of cap 16. An adapter module 25 is formed, adapter housing 8 of which is captively connected to cap 16. In this embodiment, adapter system 1 comprises at least two adapter modules 25, 25'. Contact surfaces 10 of different adapter modules 25 or 25', respectively, are formed at predetermined different rotational positions R1 or R2, respectively, relative to connection axis 7 on cap 16.

Such adapter modules 25, 25' can be produced in a simple manner by injection molding which is particularly advantageous for large production quantities and eliminates an additional assembly step, as would be required in the alternative embodiment of an adapter housing 8 that is attachable to the cap 16.

Cap 16 in adapter modules 25, 25' could otherwise be identical, apart from the contact surface arranged at different rotational positions R1, R2. As can be seen, for example, in FIG. 1, cap 16 can also be provided with various other features, for example, connecting elements for control lines, other interfaces, etc., which are not relevant for the present invention and which shall not be discussed in detail at this point.

In the two adapter modules 25, 25' shown in FIGS. 1 and 2, contact surface 11 in one adapter module 25 is rotated by 180° relative to connection axis 7 in comparison to other adapter module 25'. Rotational positions rotated by 180° relative to each other make it possible, for example, to contact the common single-phase as well as three-phase connector faces to a universal connector. A triangular shape with ground and two current-carrying contacts in a single-phase contact arrangement rotated by 180° can be found in a common contact arrangement of a three-phase connector face, namely in the ground as the middle one of the charging socket contact elements in the row of three and the two current-conducting charging socket contact elements in the row of two.

Adapter housing 8 can comprise a locking element 26 for affixing a connected connector 2 in cabling interface 13. The locking element 26 can be, for example, a projection or an opening in which a complementary locking element of the connector 2 engages in a positive-fit manner when the connector 2 is seated correctly in the cabling interface 13. In the embodiment shown, locking element 26 is configured, for example, as a locking projection 27 which projects from the exterior of cabling interface 13 and which provides a positive-fit connection, for example, a latch, to a complementary locking hook 28 which is arranged on connector 2. The latch prevents unintentional detachment of connector 2 from cabling interface 13 and is repeatedly detachable.

Locking element 26 can be arranged in a stationary manner relative to contact surface 10. Stationary means that the spatial relationship between locking element 26 and contact surface 10 does not change, and locking element 26 is disposed in each rotational position R1, R2 at the same circumferential position of contact surface 10. Locking element 26 therefore co-rotates, as can be seen, for example, in FIGS. 1 to 4. Locking element 26 also provides a coding which ensures that connector 2 can only be connected to adapter interface 13 in the position required for the electrical connection.

Adapter system 1 can also comprise guide elements 29, for example, contact bridges 30 or contact redirections 31. The geometry, i.e. the spatial arrangement relative to one another or the configuration, i.e. the number of charging socket contact elements 38 in a contact arrangement 4 can therefore be adapted to the arrangement of connector contacts 14 in universal connector 2 where necessary. Exemplary guide elements 29 are shown in FIG. 1. What these guide elements 29 look like and how they can be employed shall be explained in more detail hereafter.

Figure 3:
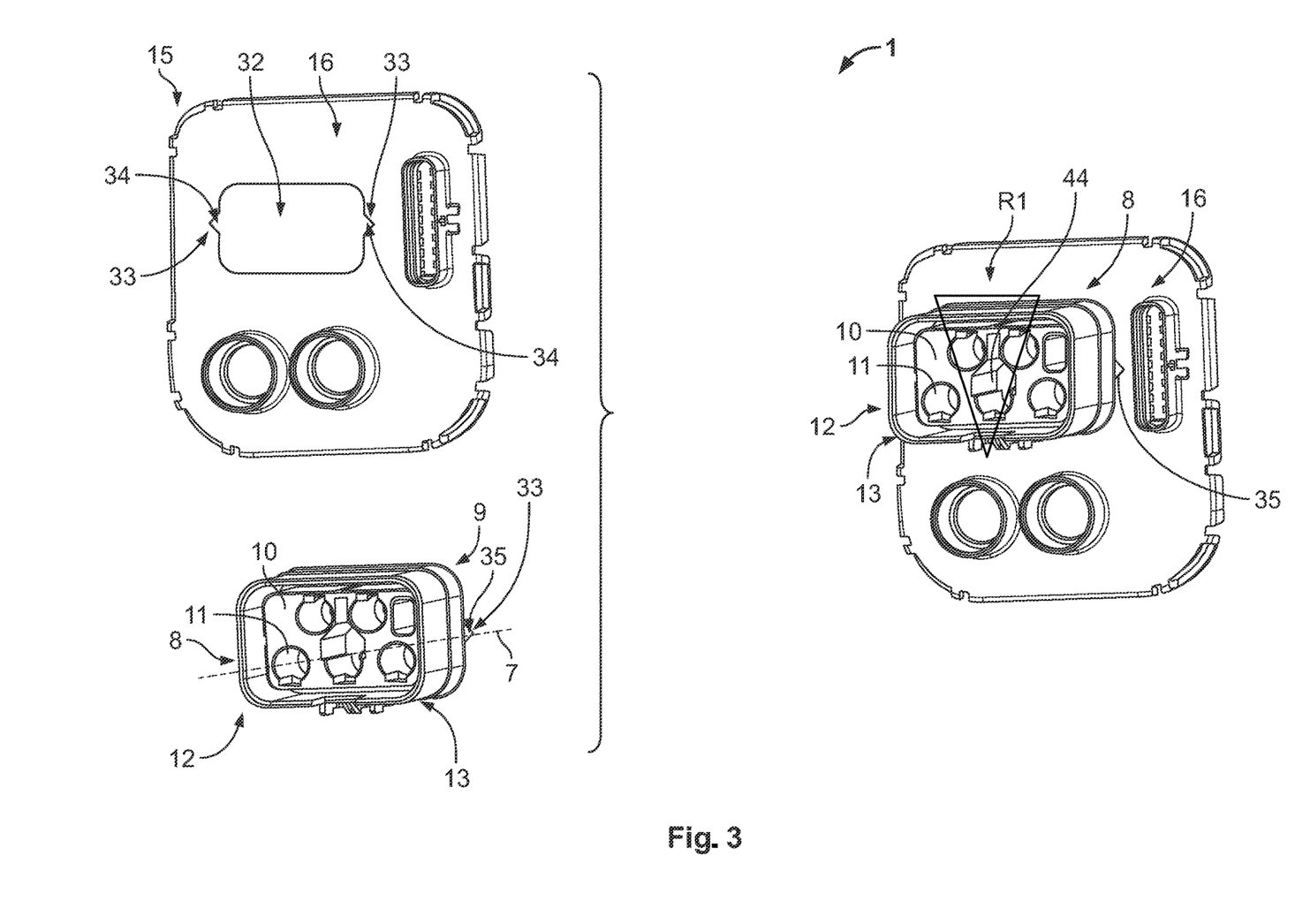
FIG. 3 is a perspective view of an adapter system according to another embodiment.

A further embodiment of an exemplary adapter system 1 shall be described hereafter with reference to FIGS. 3 and 4.

In this embodiment, cap 16 comprises an adapter opening 32 which covers contact surface 10. Adapter housing 8 is configured to be attachable to cap 16. Adapter housing 8 can cover adapter opening 32 in different orientations and in this manner provide different rotational positions R1, R2. In the examples shown in FIGS. 3 and 4, adapter housing 8 is attachable to cap 16 in two orientations rotated by 180° relative to one another.

For attaching adapter housing 8 captively to cap 16, adapter housing 8, in particular at its end 9 on the socket side, and/or cap 16, in particular in the region comprising adapter opening 32, can be provided with assembly devices. Assembly devices can be, for example, latching hooks at the end on the socket side projecting in the direction of the connection axis 7 which can engage behind the adapter opening 32 in the cap 16 and in this way affix the adapter housing 8 on the cap 16. Other possible assembly devices are, for example, a catch, a flange with connecting sections, for example, screw openings or welded sections. Other ways of attaching the adapter housing to the cap, for example, pressing in or screwing on, or some other type of a positive-fit connection are also possible. A positive substance-fit connection by applying adhesive is also possible.

The correct alignment of adapter housing 8 on cap 16 can be specified by alignment members 33. In the exemplary embodiment of FIGS. 3 and 4, two alignment bays or cavities 34 arranged offset by 180° relative to one another along adapter opening 32 are formed as alignment members 33. These alignment sockets 34 serve to receive an alignment tooth 35 which is arranged on end 9 of adapter housing 8 on the socket side and which fits exactly into alignment bays 34 of adapter opening 32. The predetermined alignment of adapter housing 8 in alignment opening 32 of cap 16 is specified in this way, depending on into which of two alignment sockets 34 the alignment tooth 35 is inserted.

In the exemplary embodiment shown in FIGS. 3 and 4, only two orientations rotated by 180° with respect to one another are possible. This is determined by the rectangular cross sections of adapter housing 8. However, alternative configurations are also possible in which contact surface 10 is, for example, circular and therefore rotationally symmetrical, and in which different orientations of adapter housing 8 on cap 16, for example, three orientations rotated by 120° or four rotated by 90° relative to one another, are possible by using suitable coding mechanisms, for example, indentations or bulges provided at specific locations of the circular shape. The cap 16 also protects the charging socket 5, 6 from the environment, for example from dirt.

An exemplary parts kit 36 for the electrical connection of connector 2 of cabling 3 to different contact arrangements 4 of different charging sockets 5, 6 is presented below with reference to FIG. 5.

Parts kit 36 comprises an adapter system 1 according to the invention. FIG. 5 shows, for example, an adapter system 1 comprising a cap 16 as a fastening element 15 with adapter opening 32 and adapter housing 8 that is attachable therein, as shown in FIGS. 3 and 4. Adapter system 1 of parts kit 36 from FIG. 5 also comprises guide elements 29 which are shown in FIG. 1 and shall be explained in more detail hereafter. Parts kit 36 furthermore comprises at least two charging sockets 5, 6, exactly two in the embodiment shown, each of which comprises a defined plugging face 18 and in which a contact arrangement 4 conforming to respective plugging face 18 is arranged. Possible assembled contact arrangements 4 can be seen, for example, in FIGS. 7 to 13. Only the components of contact arrangement 4, namely a contact mount 37 and charging socket contact elements 38, are shown in FIG. 5. In the exemplary embodiment, two different charging socket contact elements 38 are shown. A ground contact 39 and a current contact 40, both of which are substantially pin-shaped, but can differ from one another in terms of their length and in some sections in their diameter.

Figure 5:
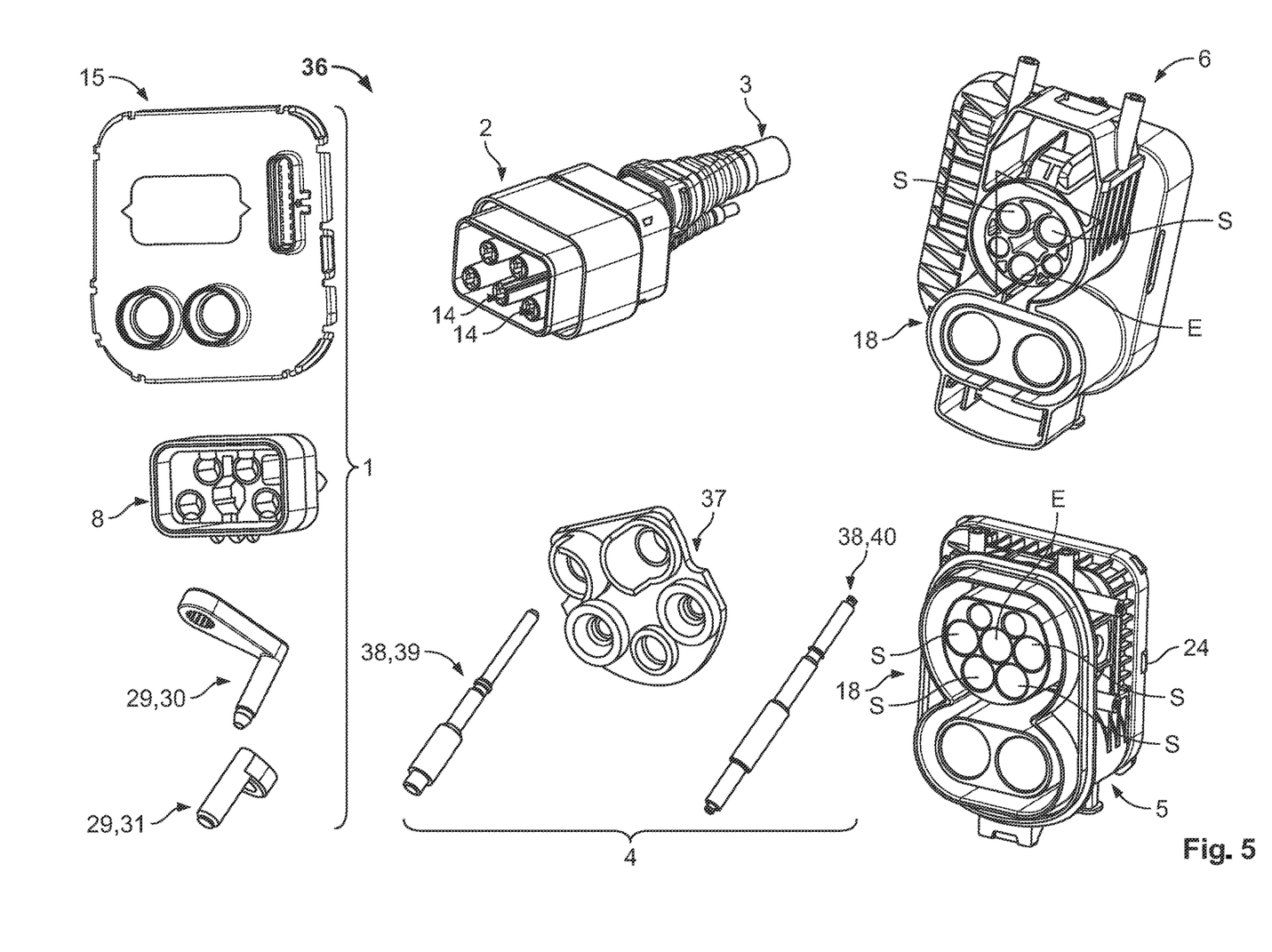
FIG. 5 is a perspective view of a parts kit for the electrical connection of a connector of a cabling with contact arrangements of different charging sockets.

Parts kit 36 shown in FIG. 5 further comprises a connector 2 having connector contacts 14. The geometry and configuration of connector contacts 14 of connector 2 is complementary to the configuration and geometry of contact openings 11 in contact surface 10. In the exemplary embodiment shown, the contact configuration and/or geometry is based on that of a three-phase charging system. This three-phase charging system comprises a total of five contacts or contact openings, respectively, which are arranged in a "D" shape in two rows, one row of three and an adjacent row of two. The middle contact of the row of three is the neutral conductor for ground. The other four are current conductors. Connector 2 that is compatible with cabling interface 13, in particular the former's connector contacts 14, are electrically connected to cabling 3. Only the end section of cabling 3 is indicated schematically. The other end of this cabling leads, for example, to a rechargeable battery of an electric motor-driven transportation device.

Inter alia the use of adapter system 1 and further inventive aspects shall be discussed hereafter with reference to FIGS. 6 to 13.

Figure 6:
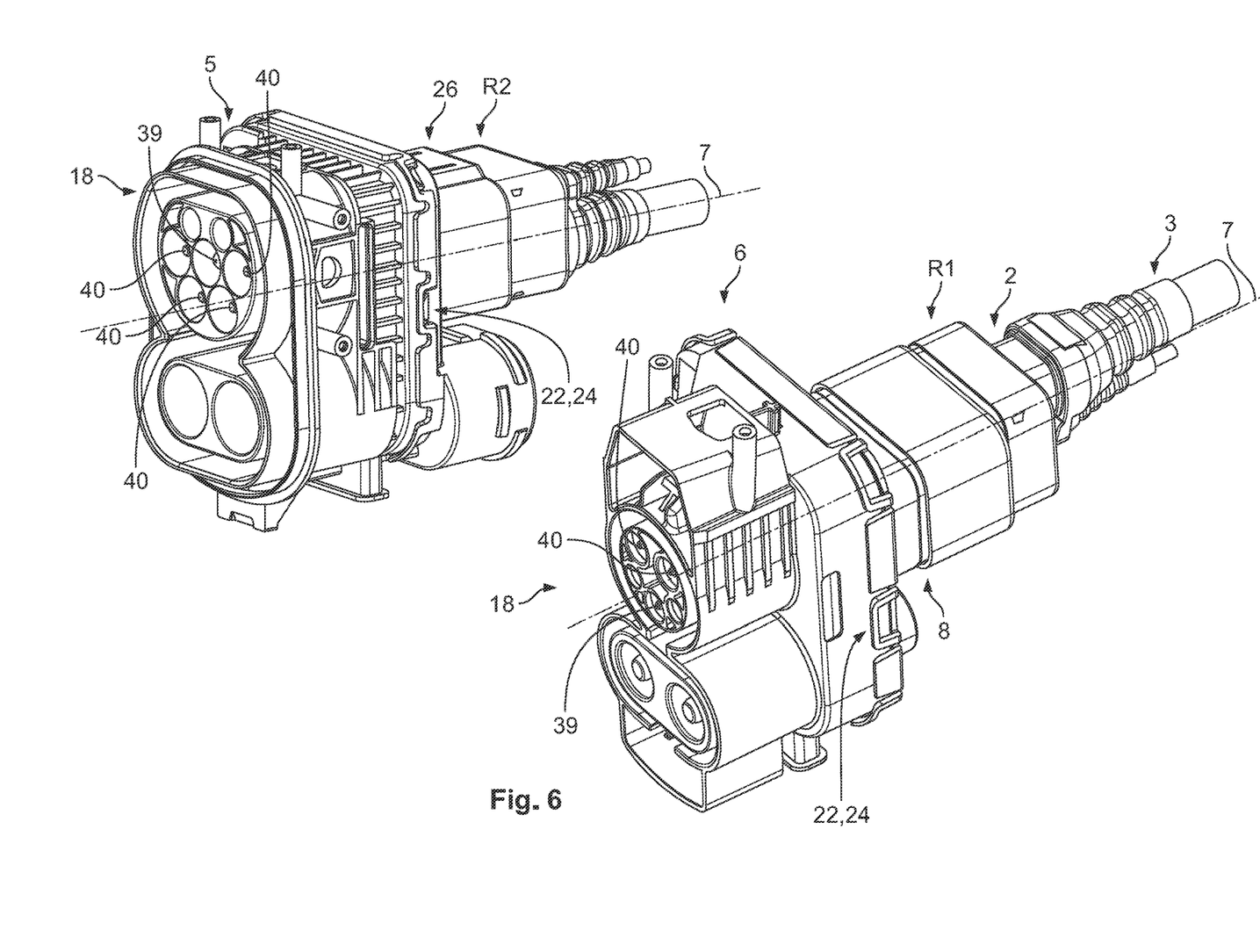
FIG. 6 is a perspective view of two different charging sockets which are electrically connected to the connector by way of an adapter system.

It is first shown in FIG. 6 what parts kit 36 can look like in the mounted state. In this mounted state, contact arrangement 4 is arranged in corresponding charging socket 5, 6 such that it conforms to respective plugging face 18. One charging socket 5 is a three-phase charging socket type CCS 2. In addition to the five openings in a recumbent D-shape which are circled in FIG. 5 for illustration purposes and of which the central middle opening of the row of three is associated with ground contact 39 as ground contact opening 44, mating face 18 of this charging socket 5 comprises two uncircled openings for signal contacts 41. These signal contacts 41 are used to verify the proper electrical connection and to control the charging process.

Other charging socket 6 is type CCS 1. It is a single-phase charging socket 6 which also comprises two signal contacts 41 which correspond to smaller openings disposed in the central circular geometry of the connector face. In addition to a ground contact 39, single-phase charging socket 6 furthermore comprises two current contacts 40 which are associated with openings marked as "S". In connector face 18 of single-phase charging socket 6, the openings for ground E and for current S are positioned at the corners of a triangle.

Respective contact arrangement 4 is arranged to conform with respective plugging face 18 of corresponding charging socket 5, 6 therein. Cap 16 closes rear side 17 of charging socket 5, 6, so that latching openings 22 and latching projections 24 latch together. Connector 2 is arranged in cabling interface 13 and is locked against unintentional removal by way of a locking projection 27 and locking hook 28. The electrical connection has been established in this state. Connector contacts 14 of connector 2 are electrically conductively connected to charging socket contact elements 38 of contact arrangement 4. End 9 of adapter housing 8 on the socket side is there attached in dependence of contact arrangement 4 to respective charging socket 5, 6 by way of fastening element 15, i.e. cap 16 with its contact surface 10 in a predetermined rotational position R1, R2 relative to connection axis 7. This can be realized from the fact that locking elements 26 in three-phase charging socket 5 in FIG. 3 point upwardly. In contrast, locking elements 26 at other rotational position R1 on single-phase charging socket 6 are down and therefore cannot be seen.

Figure 7:
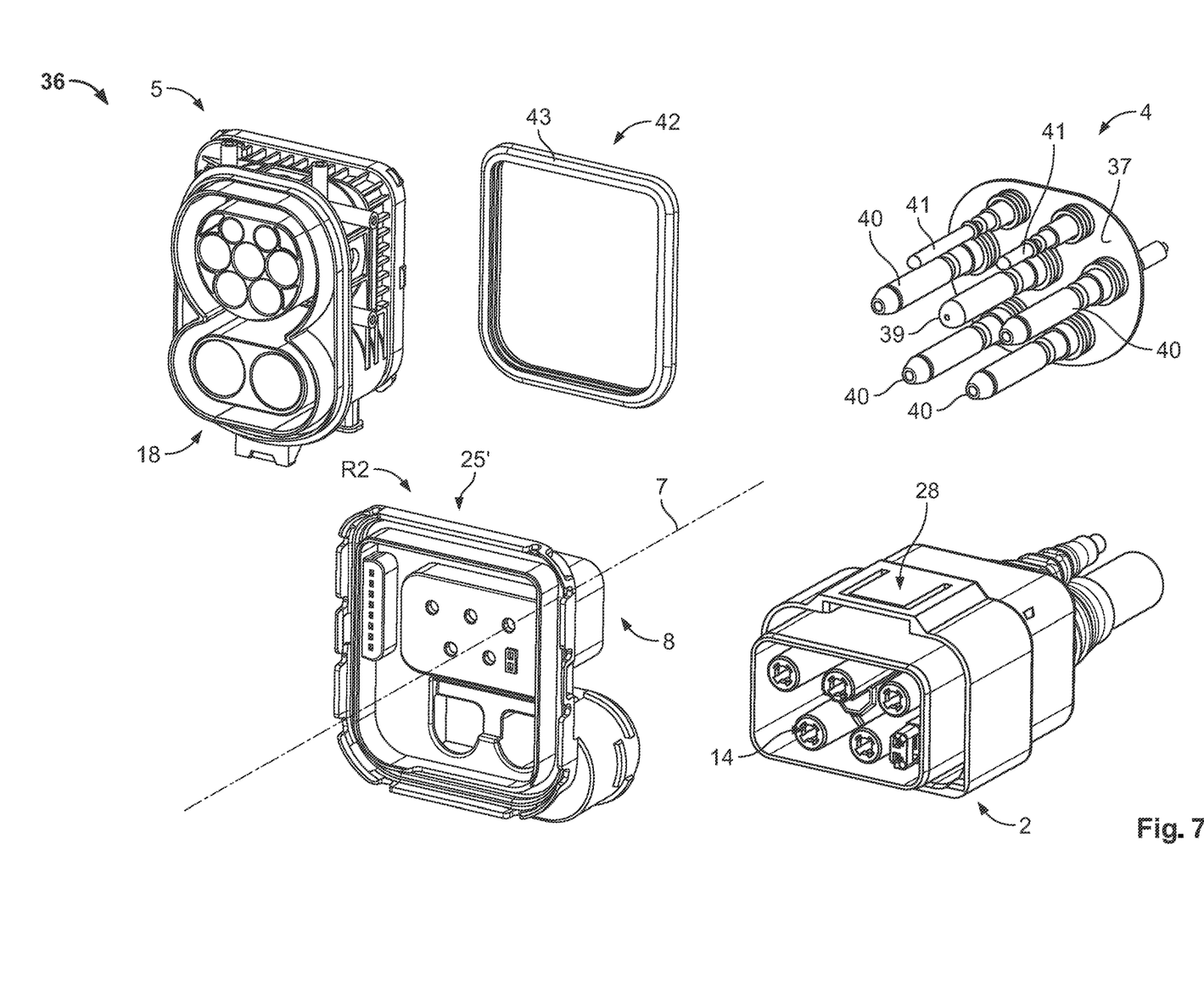
FIG. 7 is an exploded front perspective view of a parts kit of the leftmost charging socket in FIG. 6.
Figure 8:
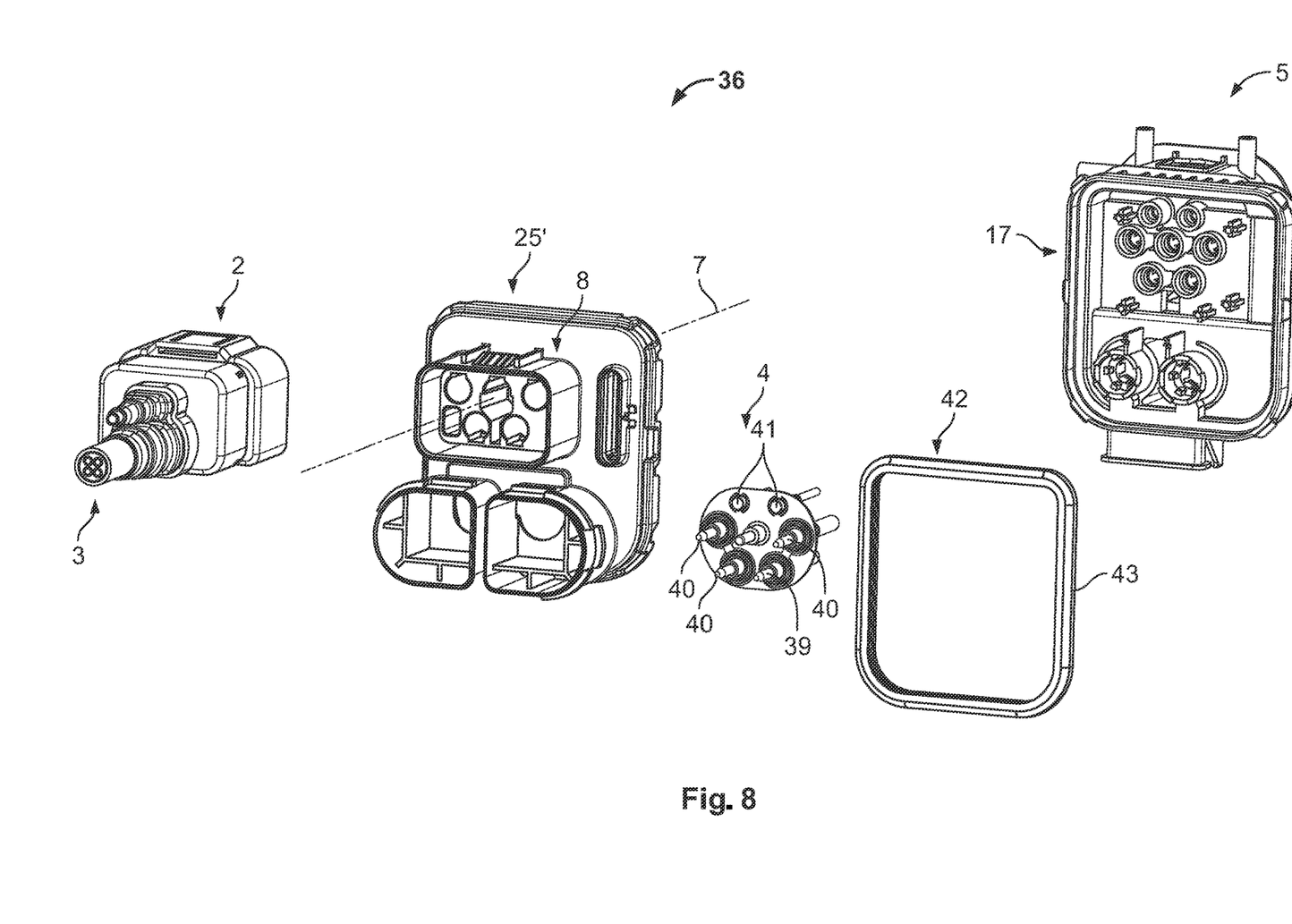
FIG. 8 is an exploded rear perspective view of the parts kit of FIG. 7.

Reference is next made to FIGS. 7 and 8 which show exploded views of an embodiment of charging socket 5 type CCS 2 shown on the left-hand side in FIG. 6. The individual elements of parts system 36 are shown in an exploded view in FIGS. 7 and 8 and are stretched apart along connection axis 7. Parts system 36 comprises three-phase charging socket 5 with standardized connector face 18, universal connector 2, and, in the embodiment shown, adapter module 25' which is shown in FIG. 1 and has already been described in more detail above.

Parts system 36 further comprises a contact arrangement 4 with a contact mount 37. Contact mount 37 is plate-shaped and comprises, as a holding point 45 for the contacts, seven passages, the configuration and geometry of which correspond to the seven openings in plugging face 18 of CCS 2 connector. In this way, central ground contact 39 and four current contacts 40 of the three-phase system are aligned correctly relative to one another and conform with connector face 18. In this embodiment, contact arrangement 4 further comprises two signal contacts 41. Adapter system 1 ensures that end 9 of adapter housing 8 on the socket side is attached to charging socket 5 by way of fastening element 15 with its contact surface 10 in predetermined rotational position R2 relative to connection axis 7. This ensures that universal connector 2 can only be connected to cabling interface 13 in a predetermined orientation in which corresponding connector contacts 14 are properly connected to current contacts 40 and ground contact 39 of contact arrangement 4.

In the embodiments shown in FIGS. 7 and 8, parts system 36 further comprises a sealing element 42. Sealing element 42 is configured as a sealing ring 43, the shape of which corresponds to the circumference of cap 16 or rear side 17, respectively, of charging socket 5, 6. Closure of rear side 17 of charging socket 5 can be sealed by cap 16 using sealing element 42 and the interior of charging socket 5, 6 with contact arrangement 4 can be protected against soiling.

Figures 9, 10, 11:
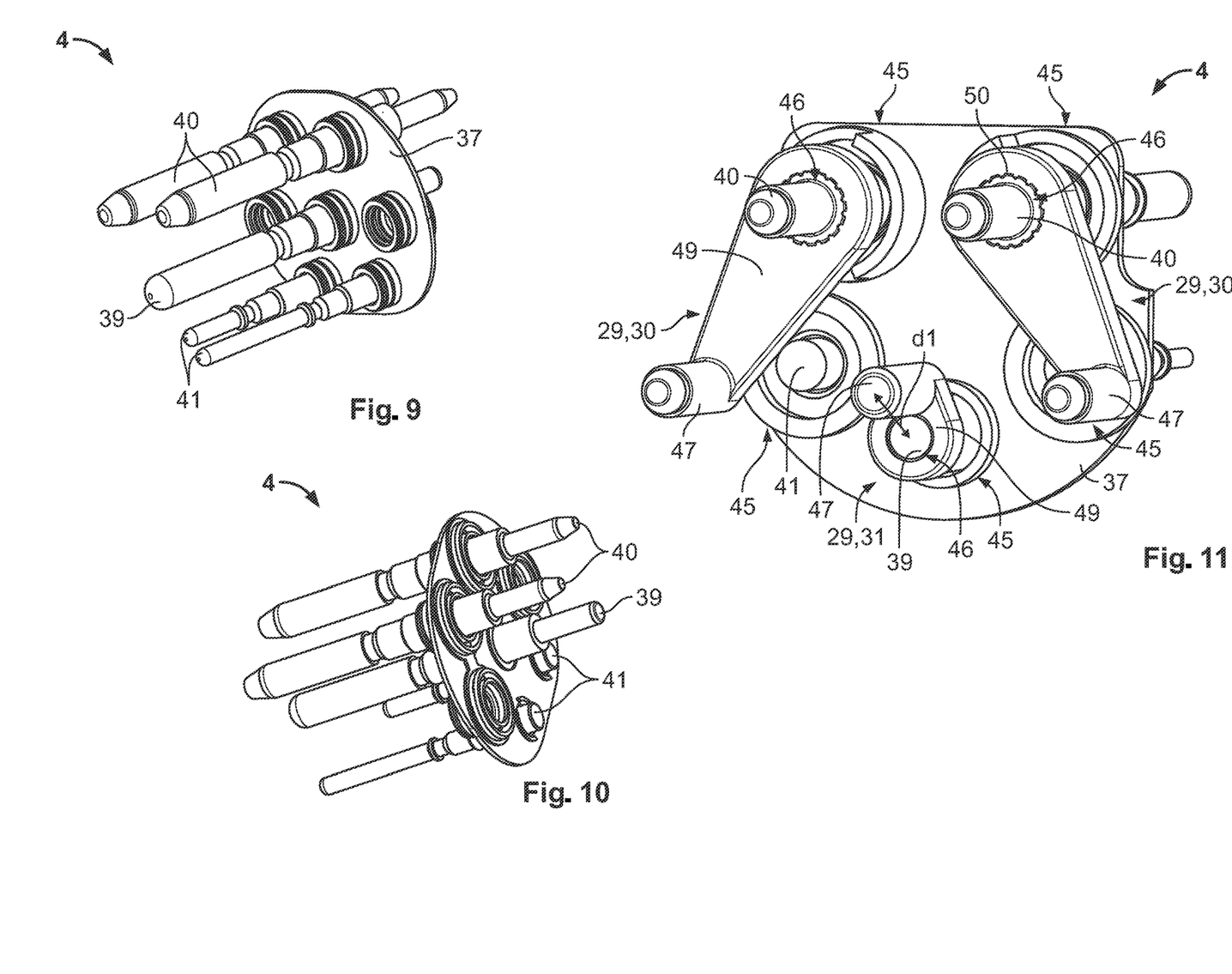
FIG. 9 is a perspective view of a contact arrangement according to an embodiment.
FIG. 10 is another perspective view of the contact arrangement of FIG. 9.
FIG. 11 is a perspective view of a contact arrangement according to another embodiment.

FIGS. 9 and 10 show a different contact arrangement 4 which can be used in charging socket 6 type CCS 1. This contact arrangement 4 also comprises a contact mount 37 and two signal contacts 41. Charging socket 6 is single-phase and therefore has only two current contacts 40 in addition to one ground contact 39. This geometry and configuration of contact arrangement 4 can be connected to connector 2 only when adapter housing 8 is rotated 180° and contact surface 10 is in rotational position R1 in which connector 2 can only be connected when rotated by 180°. In this rotational position R1, ground contact 39 of connector 2, which is associated with ground contact opening 44 of contact openings 11, is not above the row of two, but below the row of two. Three contact openings 11, which are encircled by a triangle in FIG. 3, are thereby disposed in the direction of connection axis 7 in alignment with ground contact 30 and two current contacts 40. In this way, single-phase contact arrangement 4 from FIG. 9 of charging socket 6 can be electrically connected to same connector 2 as in the three-phase embodiment of FIGS. 7 and 8.

Figure 12:
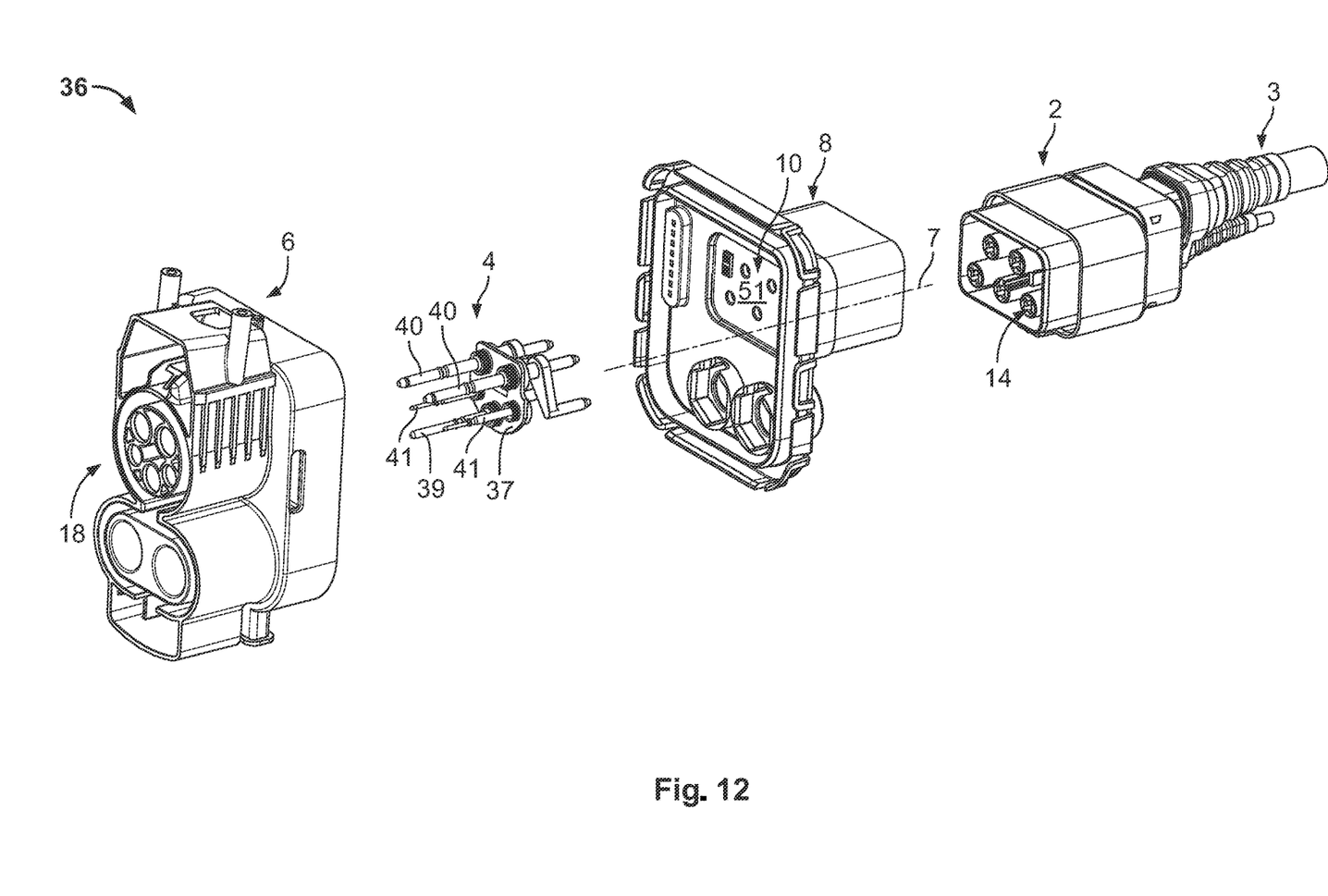
FIG. 12 is an exploded front perspective view of a further exemplary assembly of the parts kit of FIG. 5 for the rightmost charging socket of FIG. 6.
Figure 13:
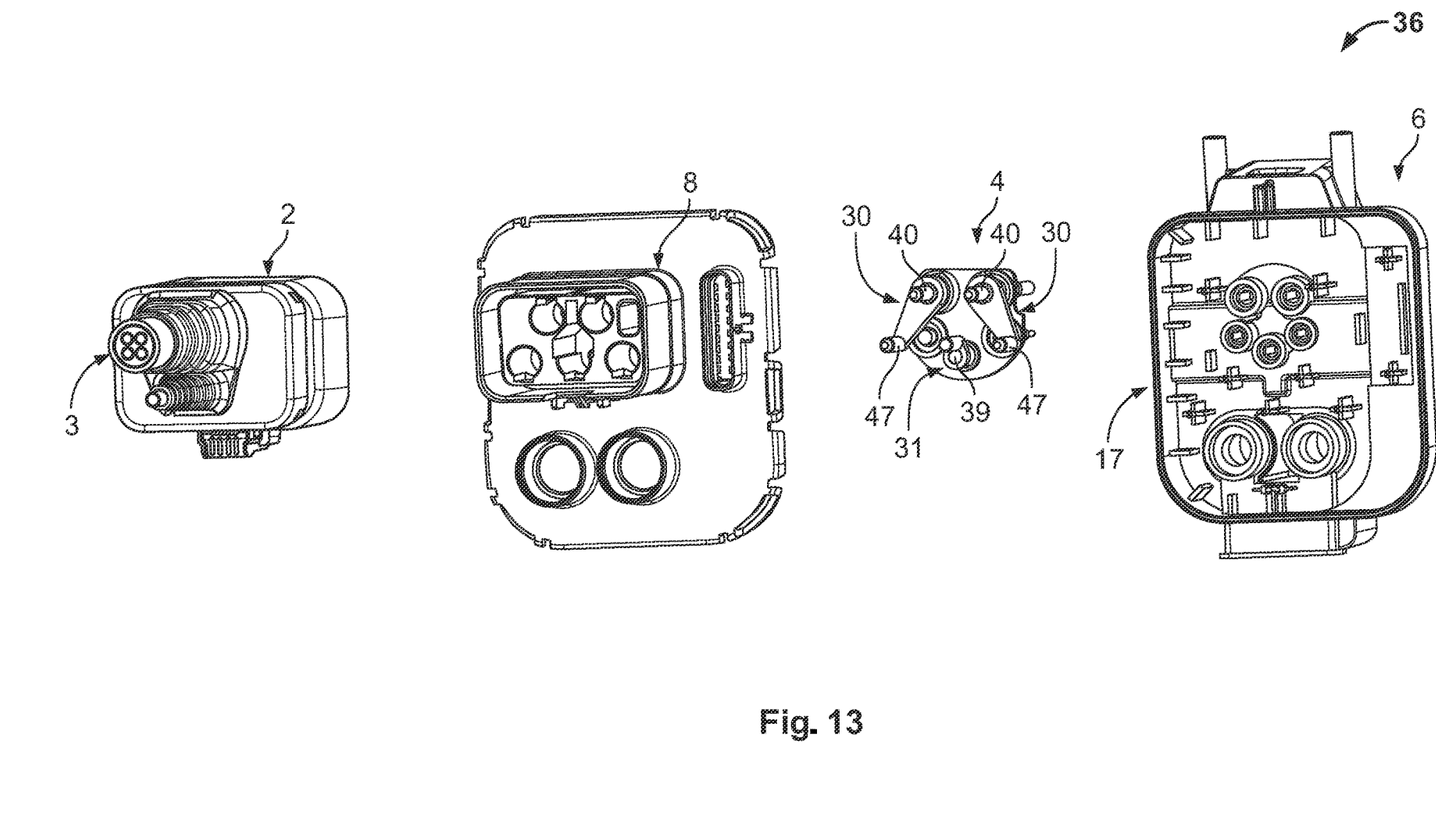
FIG. 13 is an exploded rear perspective view of the further exemplary assembly of the parts kit of FIG. 12.

Finally, FIGS. 11 to 13 shall be discussed. A further embodiment of a parts kit 36 is shown there which again uses a differently configured contact arrangement 4. This special contact arrangement 4 is a contact arrangement 4 which can also be regarded to be an independent invention and which shall be explained in more detail below, in particular with reference to FIG. 11.

Parts kit 36 shown in FIGS. 12 and 13 comprises universal connector 2 with its cabling 3 as described in detail above. Charging socket 6 is single-pole, like in the embodiment of FIGS. 7 and 8.

Contact arrangement 4 of FIGS. 11 to 13 in its basic structure is of the single-pole type. Contact mount 37 comprises five holding points 45 for arranging a ground contact 39, two current contacts 40, and two signal contacts 41 in the geometry and configuration common to single-phase charging sockets, such as the SAE J1772 or CCS-1 type.

Contact arrangement 4, which is shown in FIGS. 11 to 13, or adapter system 1 described in these figures, respectively, additionally comprises guide elements 29. In the exemplary embodiment, two contact bridges 30 as well as a contact redirection 31 are used as guide elements 29 of adapter system 1 according to the invention or of contact arrangement 4 according to the invention, respectively.

Guide elements 29 can be used to selectively modify the configuration and/or the geometry of contact arrangement 4 and to properly connect any contact arrangement to a universal connector 2.

Cases in which the contact geometry of contact arrangement 4 does not match the spatial arrangement of connector contacts 14 of connector 2 are conceivable. It may be necessary under certain circumstances that a contact point needs to be moved. In this case, adapter system 1 can comprise a contact redirection 31 for changing the spacing between two contact elements of a contact arrangement 4. This can be seen in FIG. 11 for contact redirection 31, which causes the alignment of the ground to be moved by the distance dl.

A contact bridge 30 can be used as a guide element 29 if a different configuration needs to be changed to, for example, by converting a single-pole contact arrangement 4 with one ground contact 39 and only two current contacts 41 to a three-pole system with one ground contact and four current contacts.

For this purpose, a contact bridge 30 could be used in one embodiment which electrically connects two contact openings 11 of contact surface 10. The current flowing through one current contact 40 would then be distributed to the two contacts which are associated with two contact openings 11 which are electrically connected to one another by way of contact bridge 30.

An embodiment with two contact bridges 30 makes it possible, in a simple manner, to convert the contact arrangement 4 of a single-phase charging socket with its three contact elements to a connector with a conductor arrangement 4 in the configuration of a conventional three-phase plugging face having five contact elements in "D-shape". Each of the two contact bridges 30 connects one of the contact openings 11, which are associated with a contact element in the row of two, to the respective outer contact element in the row of three.

In the embodiment shown in FIG. 1 and FIGS. 11 to 13, guide elements 29 comprise a coupling section 49, for example, a coupling opening 46 for receiving a charging socket contact element 38, for example, a current contact 40. In the embodiment shown, guide element 29 also comprises a contact pin 47. The longitudinal axis of contact pin 47 can extend laterally offset relative to coupling opening 46, but substantially perpendicular to the plane that is spanned by coupling opening 46. Coupling element 48, for example, a coupling opening 46, can be electrically conductively connected to contact pin 47 by way of a conduction section 49.

The distance between contact pin 47 and coupling element 48 determines either distance dl by which a contact 39, 40 of a contact arrangement 4 can be offset by way of a contact redirection 31. In the case of a contact bridge 30, it provides the option of providing additional contact pins 47 in adapter system 1 and establishing contact with connector contacts 14 in order to distribute a charging current evenly over a number of contacts.

As can be seen in FIG. 11, a basically single-pole contact arrangement 4 can be modified in this way for a three-pole cabling 3 by way of adapter system 1 according to the invention or a contact arrangement 4 according to the invention, respectively.

Coupling opening 46 forms a coupling element 48 which can be electrically conductively connected to a contact 39, 40 of a contact arrangement 4. Coupling element 48, for example, coupling opening 46, can comprise connection devices 50. Connection devices 50 can be, for example, pressing projections or pressing teeth which are plastically deformable and can establish a positive-fit press connection to contact 39, 40 of a contact arrangement 4. Alternative options of connection devices 50 can be crimp wings or zones for a positive-fit connection, for example, welding, soldering or toxing.

In the exemplary embodiment of FIGS. 1 and 11, guide element 29 is substantially L-shaped, where contact pin 47 represents one leg and conduction section 49 represents the other leg which extends substantially perpendicular to contact pin 47 and in which coupling element 48, for example, coupling opening 46 is formed, which can be, for example, a strip-shaped element, i.e. a conduction strip, for example, in the form of a wing.

In the exemplary embodiment of adapter system 1 shown in FIGS. 12 and 13, which comprises guide elements 29 shown in FIG. 11, coupling element 28 is arranged on surface 51 of contact surface 10 on the socket side. Surface 51 on the socket side is the surface which points in the direction of charging socket 5, 6, i.e. the side facing away from cabling interface 13. When the adapter housing 8 is connected to a charging socket 5, 6, then the contact elements of the contact arrangement 4 of the charging socket 5, 6 can extend through the contact openings 11. During attachment, the contact elements exert pressure on the coupling element 48 arranged on the surface on the socket side as they pass through the contact openings 11 and thereby facilitate proper coupling to its coupling element 48.

What is claimed is:

1. An adapter system for the electrical connection of a connector of a cabling to different contact arrangements of different charging sockets along a connection axis, comprising:
an adapter housing having a contact surface extending perpendicularly to the connection axis and a plurality of contact openings extending along the connection axis, the contact surface is disposed at an end of the adapter housing on a socket side, an end of the adapter housing on a cable side has a cabling interface connecting to the connector; and
a fastening element attaching the adapter housing to one of the charging sockets, the end of the adapter housing on the socket side is attachable to each of the charging sockets by the fastening element with the contact surface in a predetermined rotational position relative to the connection axis.

2. The adapter system of claim 1, wherein the fastening element is a cap and closes a rear side of the one of the charging sockets.

3. The adapter system of claim 2, wherein the contact openings penetrate the cap.

4. The adapter system of claim 3, wherein the cap has a connecting element affixing the cap to the one of the charging sockets.

5. The adapter system of claim 2, wherein the cap has an adapter opening covered by the contact surface.

6. The adapter system of claim 2, wherein the adapter housing is attachable to the cap.

7. The adapter system of claim 6, wherein the adapter housing is attachable to the cap in at least two orientations rotated by 180° with respect to one another.

8. The adapter system of claim 2, wherein the adapter housing is formed integrally on the cap and forms an adapter module.

9. The adapter system of claim 8, wherein the adapter module is one of a pair of adapter modules in which the contact surface is in a different predetermined rotational position relative to the connection axis.

10. The adapter system of claim 9, wherein the contact surface in one of the pair of adapter modules is rotated 180° about the connection axis relative to the contact surface in the other of the pair of adapter modules.

11. The adapter system of claim 1, wherein the adapter housing has a locking element affixing the connector in the cabling interface.

12. The adapter system of claim 11, wherein the locking element is stationary relative to the contact surface.

13. The adapter system of claim 1, further comprising a guide element adapting a geometry and/or a configuration of the contact arrangement.

14. The adapter system of claim 13, wherein the guide element is a contact bridge electrically connecting a pair of the contact openings.

15. The adapter system of claim 14, wherein the contact bridge projects through one of the pair of contact openings and has a coupling element associated with another one of the contact openings.

16. The adapter system of claim 15, wherein the coupling element is arranged on the contact surface on the socket side.

17. The adapter system of claim 13, wherein the guide element is a contact redirection changing a spacing between a pair of charging socket contacts.

18. A parts kit, comprising:
a pair of charging sockets each having a plugging face and in which a contact arrangement conforming to the plugging face is arranged;
an adapter system including an adapter housing and a fastening element attaching the adapter housing to one of the charging sockets, the adapter housing has a contact surface extending perpendicularly to a connection axis and a plurality of contact openings extending along the connection axis, the contact surface is disposed at an end of the adapter housing on a socket side, an end of the adapter housing on a cable side has a cabling interface, the end of the adapter housing on the socket side is attachable to each of the charging sockets by the fastening element with the contact surface in a predetermined rotational position relative to the connection axis; and
a connector of a cabling connected to the cabling interface.

* * * * *